United States Patent
Kinoshita

(10) Patent No.: US 10,863,074 B2
(45) Date of Patent: Dec. 8, 2020

(54) COMMUNICATION APPARATUS, CONTROL METHOD OF THE SAME, ELECTRONIC APPARATUS, AND SYSTEM

(71) Applicant: CANON KABUSHIKI KAISHA, Tokyo (JP)

(72) Inventor: Yuichi Kinoshita, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/218,613

(22) Filed: Dec. 13, 2018

(65) Prior Publication Data

US 2019/0191073 A1    Jun. 20, 2019

(30) Foreign Application Priority Data

Dec. 18, 2017 (JP) .................. 2017-242231

(51) Int. Cl.
  *H04N 5/232* (2006.01)
  *H04M 1/725* (2006.01)
  *H04N 7/18* (2006.01)

(52) U.S. Cl.
  CPC ...... *H04N 5/23206* (2013.01); *H04M 1/7253* (2013.01); *H04N 5/23216* (2013.01); *H04N 5/23241* (2013.01); *H04N 5/232411* (2018.08); *H04N 7/18* (2013.01); *H04M 2250/52* (2013.01)

(58) Field of Classification Search
  CPC .................................. H04B 1/1027
  See application file for complete search history.

(56) References Cited

U.S. PATENT DOCUMENTS

| | | | |
|---|---|---|---|
| 8,676,273 B1* | 3/2014 | Fujisaki | H04M 1/6505 |
| | | | 455/567 |
| 2007/0037605 A1* | 2/2007 | Logan | H04M 3/42229 |
| | | | 455/567 |
| 2012/0148068 A1* | 6/2012 | Chandra | H04W 16/14 |
| | | | 381/94.1 |

FOREIGN PATENT DOCUMENTS

JP    2015-220470 A    12/2015

\* cited by examiner

*Primary Examiner* — Nabil H Syed
*Assistant Examiner* — Cal J Eustaquio
(74) *Attorney, Agent, or Firm* — Cowan, Liebowitz & Latman, P.C.

(57) ABSTRACT

A communication apparatus comprises a communication unit that wirelessly communicates with an electronic apparatus present within a predetermined range, a detection unit that detects a wireless signal transmitted from the electronic apparatus at a predetermined frequency, and a control unit that performs a function to control the electronic apparatus via the communication unit. The control unit changes the predetermined frequency according to the state of the function.

13 Claims, 11 Drawing Sheets

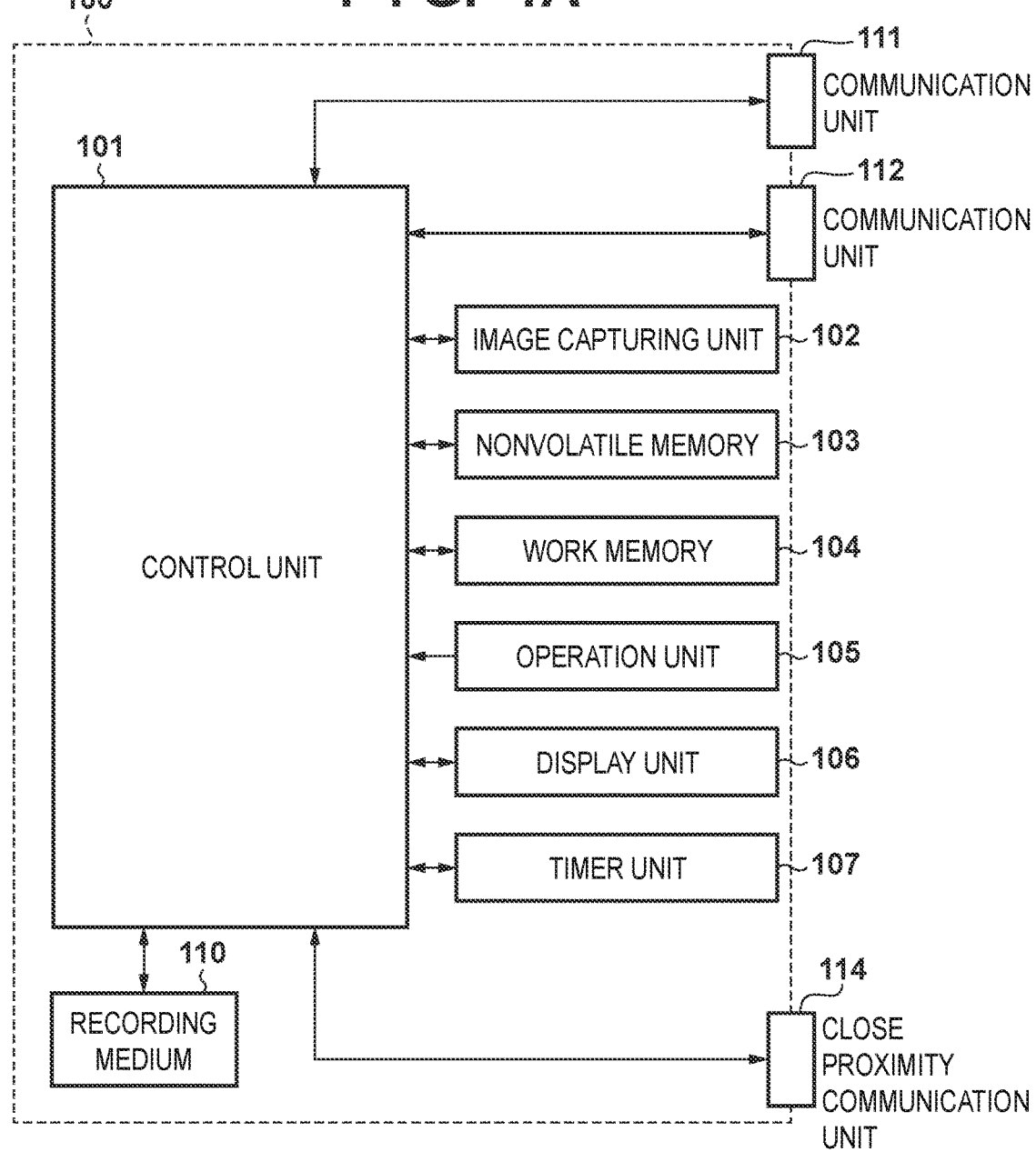
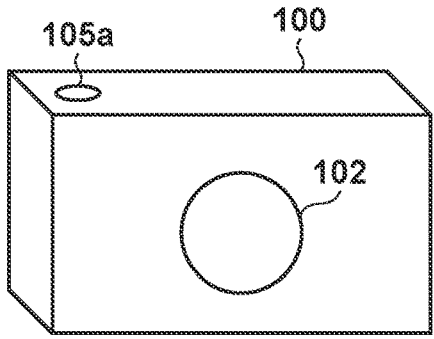
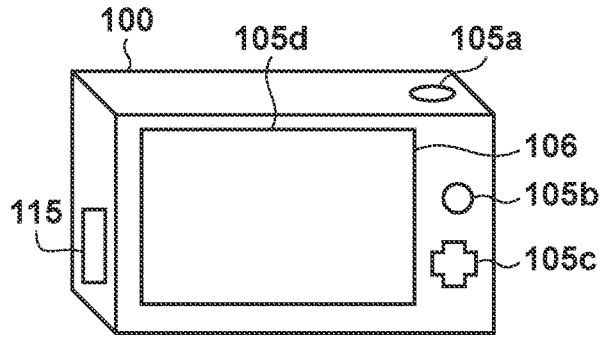

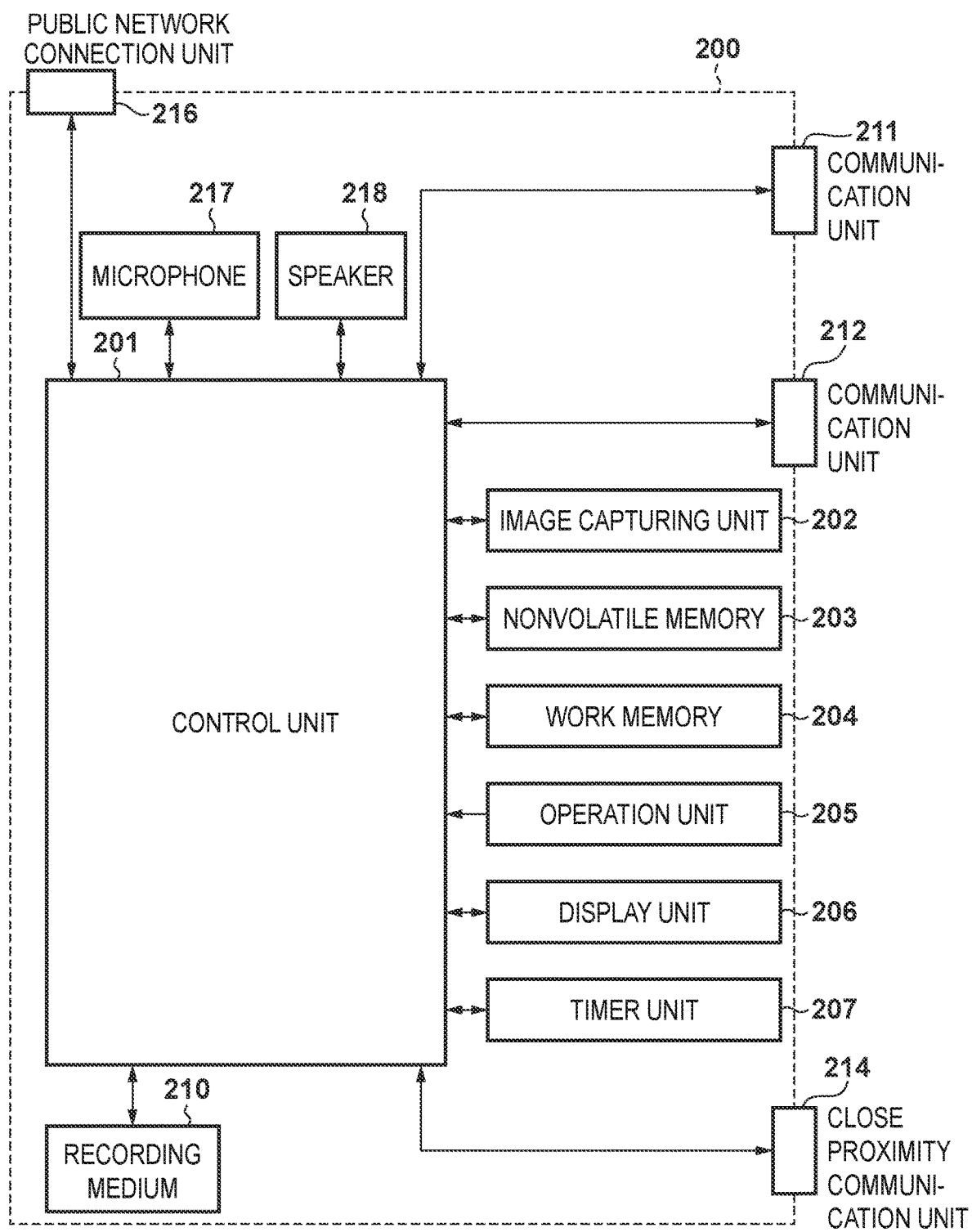

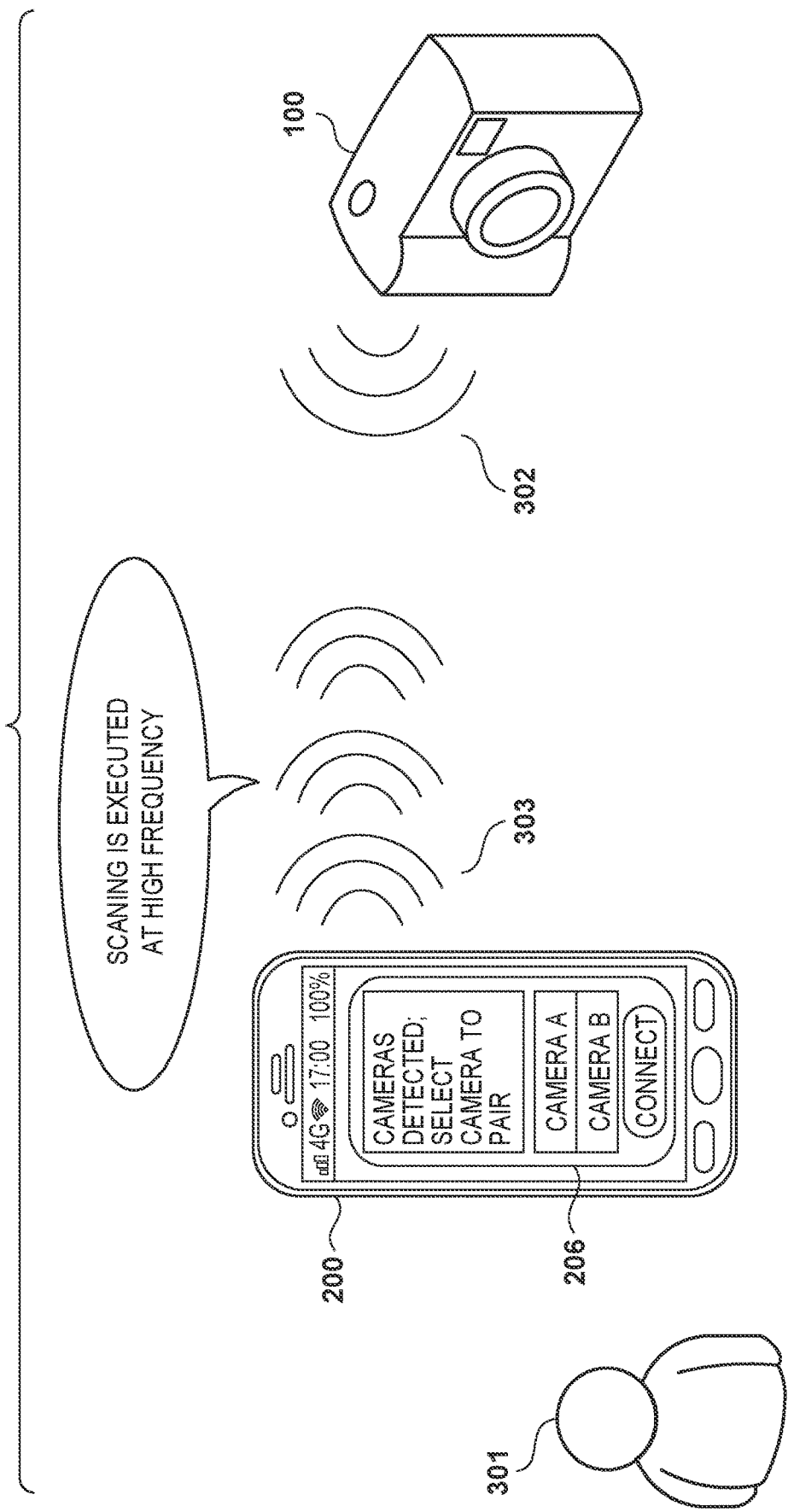

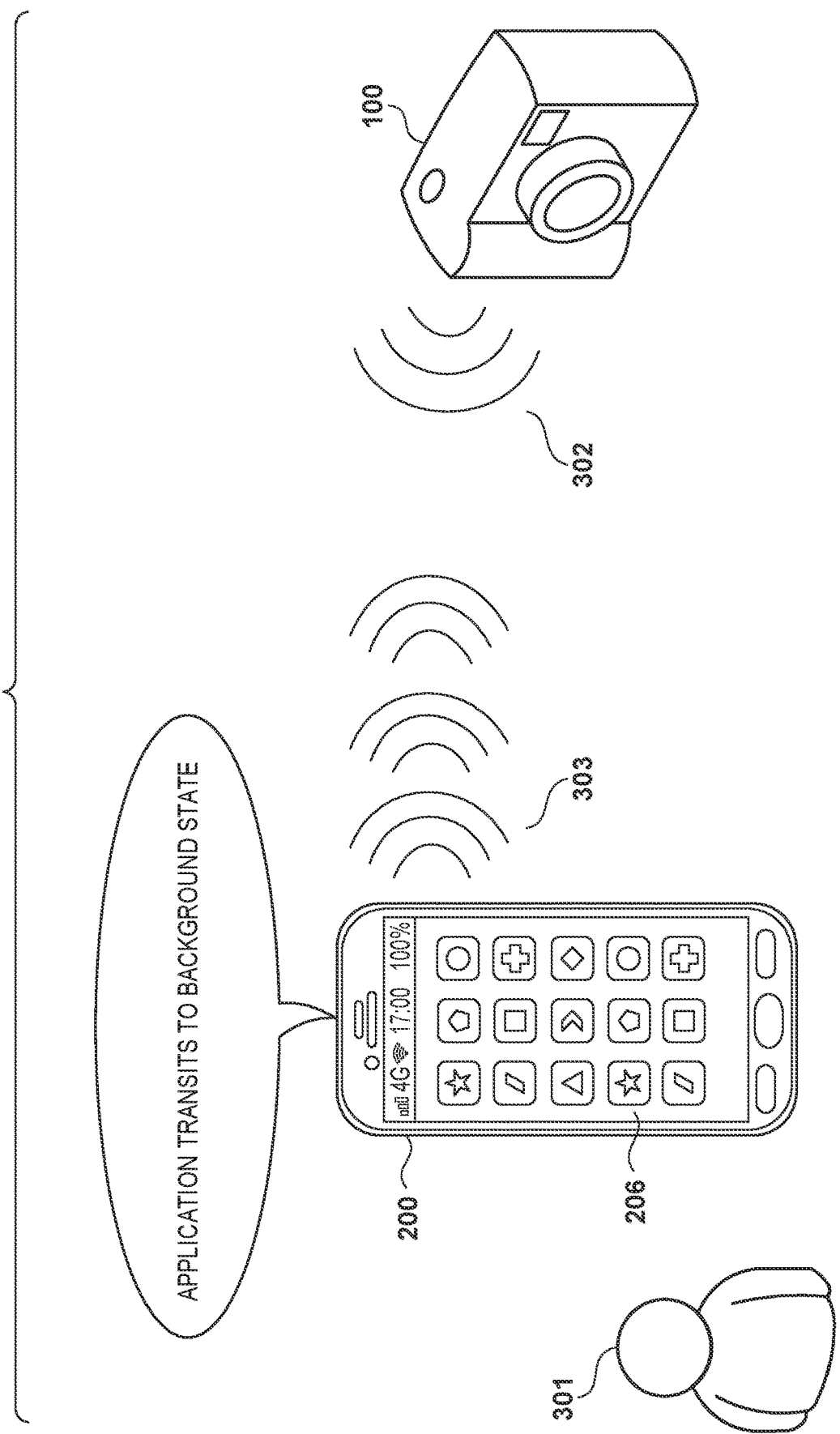

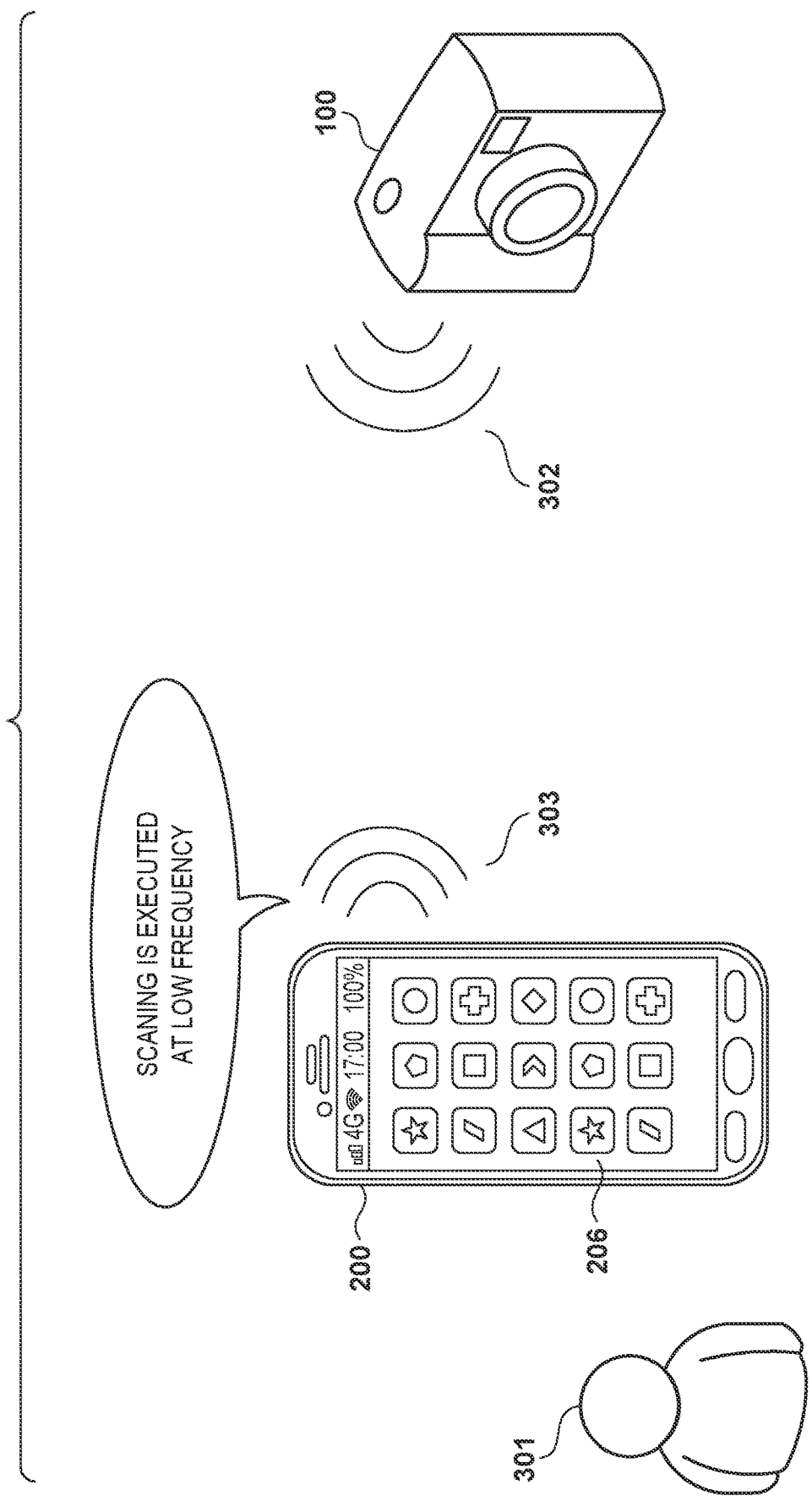

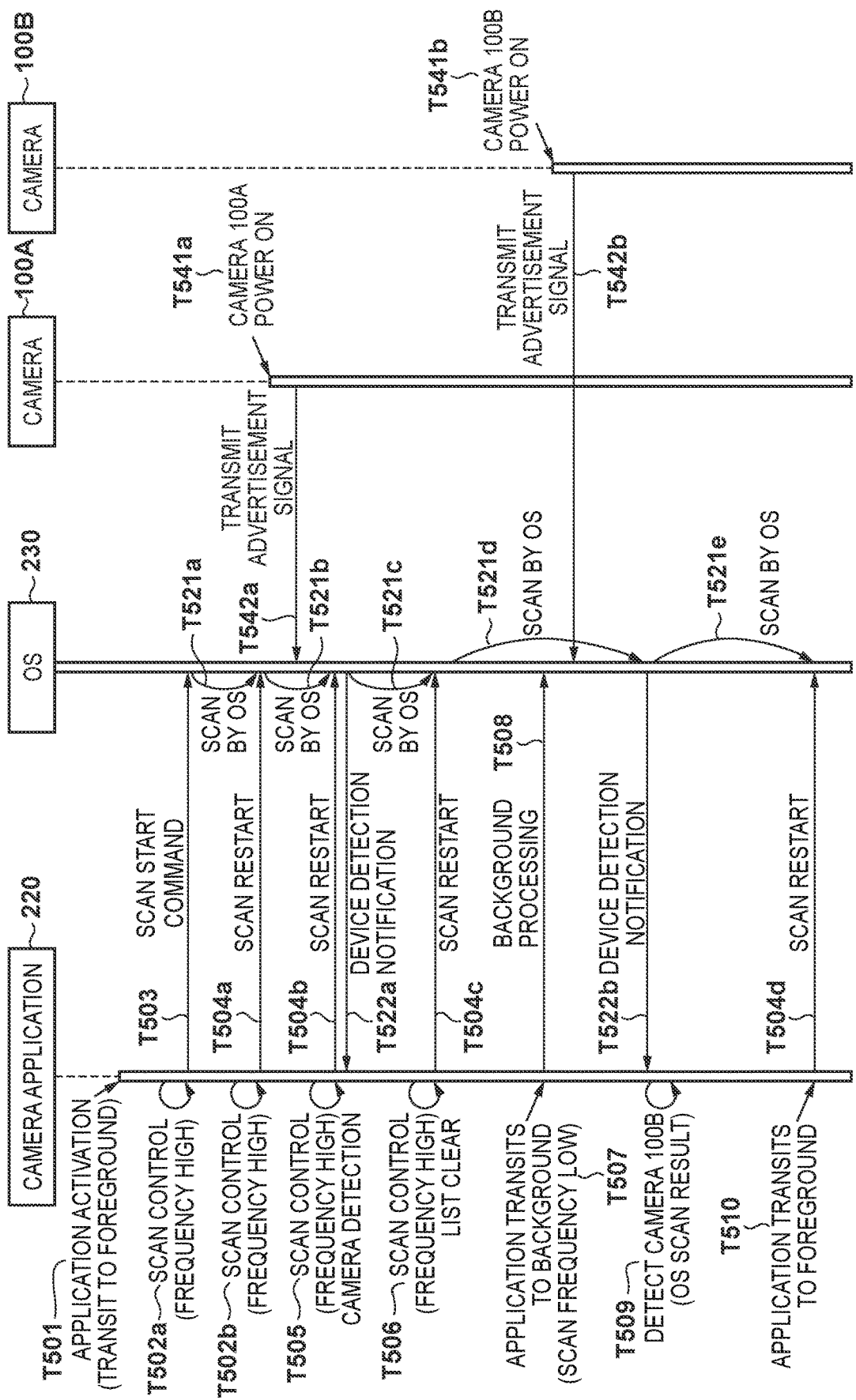

FIG. 9

| SIGNAL TYPE \ APPLICATION STATE | FOREGROUND | BACKGROUND |
|---|---|---|
| ADVERTISEMENT SIGNAL 1 | SCAN FREQUENCY <HIGH> | SCAN FREQUENCY <MIDDLE> |
| ADVERTISEMENT SIGNAL 2 | SCAN FREQUENCY <LOW> | SCAN FREQUENCY <LOW> |

COMMUNICATION APPARATUS, CONTROL METHOD OF THE SAME, ELECTRONIC APPARATUS, AND SYSTEM

BACKGROUND OF THE INVENTION

Field of the Invention

The present invention relates to a technique of performing wireless communication.

Description of the Related Art

In recent years, there is a digital camera equipped with Bluetooth® and a Wi-Fi function so that a still image or a moving image recorded by the digital camera can also be used in a mobile phone which is a so-called smartphone. Constant connection to a smartphone by Bluetooth® communication is assumed in such a digital camera, and the digital camera transmits an advertisement packet indicating its presence to its surroundings so that it can be discovered by a connection target smartphone. When the smartphone discovers the digital camera, it performs Bluetooth® communication with the digital camera. When the Bluetooth® communication between the digital camera and the smartphone is completed, the digital camera and the smartphone can perform low power consumption communication. In the Bluetooth®, rapid data transfer can be performed by switching to a wireless LAN connection as needed by an application of the smartphone in a constantly connected state. In addition, encrypted data communication is possible by performing pairing between the digital camera and the smartphone.

In order to perform communication using the Bluetooth®, it is necessary for the smartphone to detect the advertisement packet transmitted by a connection partner device. However, when a frequency of signal detection processing (scanning) on the smartphone is high and a scan period is long, the smartphone consumes excessive electric power. In order to reduce power consumption of the device that performs the scanning, as described in Japanese Patent Laid-Open No. 2015-220470, a method of controlling a scan frequency in response to input of signal that is different from the advertisement packet transmitted by the connection partner device has been proposed.

As described above, in order to reduce power consumption by the scanning, it is necessary to appropriately control the frequency and duration of the scanning.

SUMMARY OF THE INVENTION

The present invention has been made in consideration of the aforementioned problems, and realizes a technique that can control scan frequency appropriately and reduce power consumption.

In order to solve the aforementioned problems, the present invention provides a communication apparatus comprising: a communication unit configured to wirelessly communicate with an electronic apparatus present within a predetermined range; a detection unit configured to detect a wireless signal transmitted from the electronic apparatus at a predetermined frequency; and a control unit configured to perform a function to control the electronic apparatus via the communication unit; wherein the control unit changes the predetermined frequency according to the state of the function.

In order to solve the aforementioned problems, the present invention provides an electronic apparatus comprising: a communication unit configured to wirelessly communicate with a communication apparatus present within a predetermined range; and a control unit configured to control the communication unit to transmit a wireless signal that notifies the communication apparatus of the presence of the electronic apparatus; wherein the wireless signal contains information that indicates whether it is possible to connect to the communication apparatus.

In order to solve the aforementioned problems, the present invention provides a system in which a communication apparatus wirelessly communicates with an electronic apparatus present within a predetermined range; wherein the electronic apparatus comprises: a communication unit configured to wirelessly communicate with the communication apparatus present within the predetermined range; and a control unit configured to control the communication unit to transmit a wireless signal that notifies the communication apparatus of the presence of the electronic apparatus; wherein the communication apparatus comprises: a communication unit configured to wirelessly communicate with the electronic apparatus present within the predetermined range; a detection unit configured to detect a wireless signal transmitted from the electronic apparatus at a predetermined frequency; and a control unit configured to perform a function to control the electronic apparatus via the communication unit; wherein the control unit of the communication apparatus changes the predetermined frequency according to the state of the function.

In order to solve the aforementioned problems, the present invention provides a method of controlling a communication apparatus having a communication unit configured to wirelessly communicate with an electronic apparatus present within a predetermined range, the method comprising: detecting a wireless signal transmitted from the electronic apparatus at a predetermined frequency; and performing a function to control the electronic apparatus via the communication unit; wherein the performing changes the predetermined frequency according to the state of the function.

In order to solve the aforementioned problems, the present invention provides a non-transitory computer-readable storage medium storing a program for causing a computer to function as a communication apparatus comprising: a communication unit configured to wirelessly communicate with an electronic apparatus present within a predetermined range; a detection unit configured to detect a wireless signal transmitted from the electronic apparatus at a predetermined frequency; and a control unit configured to perform a function to control the electronic apparatus via the communication unit; wherein the control unit changes the predetermined frequency according to the state of the function.

In order to solve the aforementioned problems, the present invention provides a non-transitory computer-readable storage medium storing a program for causing a computer to function as an electronic apparatus comprising: a communication unit configured to wirelessly communicate with a communication apparatus present within a predetermined range; and a control unit configured to control the communication unit to transmit a wireless signal that notifies the communication apparatus of the presence of the electronic apparatus; wherein the wireless signal contains information that indicates whether it is possible to connect to the communication apparatus.

According to the present invention, it is possible to control the scan frequency appropriately and reduce power consumption.

Further features of the present invention will become apparent from the following description of exemplary embodiments (with reference to the attached drawings).

BRIEF DESCRIPTION OF THE DRAWINGS

FIG. 1A is a block diagram of a digital camera of the present embodiment.

FIGS. 1B and 1C are front view and back view of the digital camera of the first and second embodiments.

FIG. 2 is a block diagram of a smartphone of the present embodiment.

FIGS. 3A to 3C are diagrams showing a system configuration of the present embodiment.

FIG. 5 is a sequence diagram showing how the smartphone of the first embodiment detects the digital camera by changing the scan frequency.

FIG. 9 illustrates a correspondence relationship between an advertisement signal and a state of a camera application when the smartphone changes the scan frequency according to the second embodiment.

DESCRIPTION OF THE EMBODIMENTS

Figure 4:
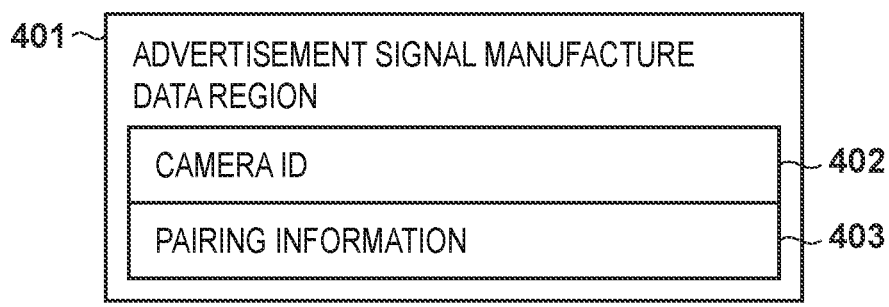
FIG. 4 is a view of the data structure of the advertisement packet of the first embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

In the present embodiment, the following describes a system in which an electronic apparatus, such as a digital camera 100, present within a predetermined range and an external apparatus, such as a smart phone 200, perform short-range wireless communication according to Bluetooth® standard. Note that the electronic apparatus of the present embodiment is not limited to the digital camera 100. For example, the electronic apparatus may be a tablet device, a media player, a surveillance camera, medical equipment, or the like. Also, the external apparatus of the present embodiment is not limited to a smart phone, which is one type of a cellular phone. For example, the external apparatus may be a portable apparatus, such as a wristwatch-type terminal, a spectacle-type terminal, a digital camera with wireless communication capability, a tablet device, a personal computer (PC), or the like.

Configuration of Digital Camera

The configuration and functions of a digital camera of the present embodiment will be generally described with reference to FIGS. 1A to 1C.

FIG. 1A is a functional block diagram of a digital camera 100. FIGS. 1B and 1C are front view and back view of the digital camera 100.

A control unit 101 is an arithmetic processing unit (CPU) which comprehensively controls the overall digital camera 100, and implements control sequence (to be described later) by executing programs stored in a nonvolatile memory 103 (to be described later). Note that a plurality of pieces of hardware may control the overall apparatus by sharing processes instead of making the control unit 101 control the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into electrical signal, and an A/D converter which converts the analog image signal output from the image sensor into digital signal.

The image capturing unit 102 has an image processing circuit, and performs image quality adjustment processing of adjusting white balance, color, brightness, and the like with respect to captured image data, and also performs, for example, resize processing to a display size. The image capturing unit 102 also generates an image file by compressing and coding the image data having undergone image quality adjustment processing by JPEG or the like, and records the file in a recording medium 110. In the present embodiment, the image data is recorded in the recording medium 110 so as to conform to DCF (Design Rule for Camera File System) standard. The image capturing unit 102 also performs predetermined arithmetic processing by using captured image data. The control unit 101 then controls the focus lens, stop, and shutter of the image capturing unit 102 based on the obtained arithmetic result, thereby performing AF (Automatic Focus) processing and AE (Automatic Exposure) processing.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing each processing of sequence and flowchart, which will be described later in the present embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons and a touch panel which accept various types of operations from the user. The operation unit 105 includes, for example, a shutter button 105a for performing image shooting, a reproduction button 105b for performing a reproduction of shot images, and four-directional keys 105c having up, down, left and right buttons for performing various settings of the camera, as shown in FIGS. 1B and 1C. The operation unit 105 also includes a touch panel 105d integrally formed on the display unit 106 described later.

The shutter button 105a is turned on to generate a first shutter switch signal SW1 when the shutter button 105a is operated halfway, that is, half-pressed (shooting preparation instruction). Upon receiving the first shutter switch signal SW1, the control unit 101 controls the image capturing unit 102 to start an operation such as AF (Automatic Focus)

processing, AE (Automatic Exposure) processing, AWB (Automatic White Balance) processing, or EF (Electronic Flash) processing. In addition, the shutter button 105*a* is turned on to generate a second shutter switch signal SW2 when the shutter button 105*a* is operated completely, that is, full-pressed (shooting instruction). Upon receiving the second shutter switch signal SW2, the control unit 101 starts a series of shooting operations from reading out a signal from the image capturing unit 102 to writing image data in the recording medium 110.

The display unit 106 displays a viewfinder image at the time of shooting, a captured image, and characters for a dialogical operation. The display unit 106 is, for example, a display device such as a liquid crystal display or organic EL display. The display unit 106 may be integrally formed with the digital camera 100 or an external apparatus connected to the digital camera 100.

A timer unit 107 counts time in accordance with time set via the operation unit 105 by the user, time information acquired from the outside via the communication units 111 and 112, or time information acquired by a radio-controlled clock.

The image capturing unit 102 records a coded image file in the recording medium 110. The control unit 101 reads out an already recorded image file from the recording medium 110. The recording medium 110 may be a memory card, hard disk drive, or the like mounted in the digital camera 100, or a flash memory or hard disk drive built in the digital camera 100.

A communication unit 111 is an interface for connection to an external apparatus. The digital camera 100 according to the present embodiment can exchange data with an external apparatus via the communication unit 111. For example, image data generated in the image capturing unit 102 can be transmitted to an external apparatus via the communication unit 111. Note that in the present embodiment, the communication unit 111 includes an interface for performing communication with an external apparatus via a so-called wireless LAN complying with the IEEE802.11 standard. The control unit 101 implements wireless communication with an external apparatus by controlling the communication unit 111. Note that the communication method is not limited to a wireless LAN and may include, for example, an infrared communication method.

A communication unit 112 is an interface for connection to an external apparatus. The digital camera 100 according to the present embodiment can exchange data with an external apparatus via the communication unit 112. For example, image data generated in the image capturing unit 102 can be transmitted to an external apparatus via the communication unit 112. Note that in the present embodiment, the communication unit 112 includes an interface for performing a short-range wireless communication according to the IEEE802.15.1 standard (so-called Bluetooth®) with an external apparatus. In the present embodiment, the Bluetooth® is in accordance with version 4.0 of Bluetooth® Low Energy (BLE) which is low power consumption, for example. The BLE has a narrower communicable range than the wireless LAN communication (that is, the communicable distance is short). The communication speed or rate of the BLE is slower than wireless LAN communication. On the other hand, the BLE consumes less power than wireless LAN communication. The control unit 101 implements the short-range wireless communication with an external apparatus by controlling the communication unit 112. Note that the communication method is not limited to BLE and may include, for example, a wireless LAN known from the IEEE802.11 standard or an infrared communication method.

Note that the communication unit 112 of the digital camera 100 of the present embodiment has either a peripheral mode or a central mode. The digital camera 100 according to the present embodiment can operate as a BLE peripheral device by causing the communication unit 112 to operate in the peripheral mode. If the digital camera 100 is to operate as the peripheral device, communication is possible by connecting the digital camera 100 to an external apparatus which is set to operate in the central mode. Note that for the authentication of a device serving as a connection partner, the unique information of the device serving as the connection partner is held in the nonvolatile memory 103 by performing pairing in advance. Also, if power is supplied to a BLE interface module even when the power supply switch is off, the digital camera 100 can transmit an advertisement packet (to be referred to as an advertisement signal or beacon signal hereinafter).

A close proximity communication unit 114 is formed from, for example, an antenna for wireless communication, a modulation/demodulation circuit for processing a wireless signal, and a communication controller. The close proximity wireless communication unit 114 outputs a modulated wireless signal from the antenna and demodulates a wireless signal received from the antenna to implement non-contact near field communication complying with the ISO/IEC18092 standard (so-called NFC: Near Field Communication). The close proximity wireless communication unit 114 of the present embodiment is arranged on the side surface of the main body unit of the digital camera 100.

The digital camera 100 and smartphone 200 of the present embodiment start communication and are connected by bringing the close proximity wireless communication unit 114 and a close proximity wireless communication unit 214 close to each other. Note that when the close proximity wireless communication unit 114 is used to connect the digital camera 100 to the smartphone 200, it is not always necessary to bring the close proximity wireless communication unit 114 and the close proximity wireless communication unit 214 into contact with each other. Since the close proximity wireless communication unit 114 and the close proximity wireless communication unit 214 can communicate with each other if they are only a predetermined distance apart, the units need only be brought close to a range in which close proximity wireless communication is possible in order to connect their respective devices.

The digital camera 100 of the present embodiment also includes a power supply antenna unit 115 on the side surface of the camera main body as shown in FIG. 1C. Power supply can be performed by bringing this antenna unit 115 within a predetermined distance of a power supply device. As a result, non-contact power supply is possible without using a cable or the like, and the start and the end of the power supply can be controlled.

Configuration of Smartphone

Next, the configuration and functions of the smartphone will be generally described with reference to FIG. 2.

The smartphone 200 according to the present embodiment includes a control unit 201, an image capturing unit 202, a nonvolatile memory 203, a work memory 204, an operation unit 205, a display unit 206, a timer unit 207, a recording medium 210, communication units 211, 212 and the close proximity wireless communication unit 214. The basic functions of the respective elements are the same as those of the digital camera 100, and hence a detailed description of them will be omitted.

The nonvolatile memory 203 stores an OS (operating system) which is the basic software executed by the control unit 201 and an application which implements an applicable function in cooperation with this OS. Communication processing of the smartphone 200 according to the present embodiment is implemented by reading software provided by the application. Note that the application has software for using the basic functions of the OS installed in the smartphone 200. Note that the OS of the smartphone 200 can have software to implement processes according to the present embodiment. The application of the present embodiment is assumed to be a camera control application (hereinafter referred to as a camera application) that controls the digital camera 100 via BLE and performs processing such as shooting of an image and browsing/saving of captured images.

The display unit 206 displays an image and a GUI (Graphical User Interface) such as characters, figures and symbols for an interactive operation. Further, the display unit 206 displays an application screen to be described later with reference to FIG. 7 displayed by the camera application in the foreground state, and the user can perform a pairing operation and a remote control with the digital camera 100 by operating this application screen.

The timer unit 207 counts time based on time information set by the user, time information acquired via the communication unit 211, the communication unit 212, or a public network connection unit 216, or time information acquired by a radio-controlled clock. The timer unit 207 may also be capable of acquiring, via a detection mechanism, time information from a mechanism such as an analog clock (in this case, the detection mechanism from the analog clock is included in the timer unit 207).

The public network connection unit 216 is an interface used for wireless communication via Wide Area Network (WAN) such as 3G or LTE. The smartphone 200 can perform telephone call and data communication with another device via the public network connection unit 216. When performing telephone call, the control unit 201 inputs and outputs voice signals via a microphone 217 and a loudspeaker 218. Assume that in this embodiment, the public network connection unit 216 is not limited to 3G or LTE and it is possible to use another communication scheme such as WiMAX, ADSL or FTTH. In addition, the communication units 211, 212 and the public network connection unit 216 need not be implemented by independent pieces of hardware. For example, one antenna can have both the functions.

Pairing Via BLE

The following describes pairing of the digital camera 100 and the smartphone 200 to perform BLE communication with reference to FIGS. 3A-3C.

Once BLE pairing is started by operation by a user 301, the digital camera 100 transmits an advertisement signal 302 to the surroundings.

Once BLE pairing is started by operation by the user 301, the smartphone 200 searches for the advertisement signal 302 transmitted by the communication unit 112 of the digital camera 100. In addition, once the communication unit 212 receives the advertisement signal 302, the smartphone 200 displays the name of the camera on the display unit 206 based on the pairing information contained in the advertisement signal 302 to notify the user that the digital camera 100 has been detected. Once the user 301 sees the notification on the display unit 206 and instructs the smartphone 200 to connect to the detected digital camera 100, the smartphone 200 transmits a connection request to the digital camera 100.

The smartphone 200 transmits a pairing request to the digital camera 100 and exchanges encryption key information to encrypt transmission data, thus allowing the smartphone 200 and the digital camera 100 to perform encrypted communication with each other. Subsequently, the smartphone 200 transmits identification information about the camera application activated on the smartphone 200 to the digital camera 100, and the digital camera 100 stores the identification information received from the smartphone 200 to complete the pairing. Note that if data communication is to be performed without exchanging key information, that is, without data encryption, the camera application operating on the smartphone 200 may store the identification information of the digital camera 100 being paired while only the identification information of the camera application may be stored in the digital camera.

Once the pairing between the digital camera 100 and the smartphone 200 is completed by following the above-described procedure, the smartphone 200 can determine that the digital camera 100 has been paired when detecting the paired digital camera 100.

Processing to Change Scan Frequency

The following describes the processing to change the frequency with which the camera application of the smartphone 200 detects (scans) the advertisement signal 302 transmitted by the digital camera 100 in the system of the present embodiment with reference to FIGS. 3A-3C.

As shown in FIG. 3A, the user 301 activates the camera application of the smartphone 200 to start a pairing operation to connect the smartphone 200 to the digital camera 100. Additionally, the user 301 turns on the power supply to the digital camera 100 and activates the BLE function of the digital camera 100 to start a pairing operation to connect to the smartphone 200.

Once starting pairing, the digital camera 100 transmits a BLE advertisement signal 302 as shown in FIG. 4 to the surroundings, and the display unit 206 of the smartphone 200 shows a list of the camera name of the digital camera 100 detected by the camera application of the smartphone 200. The display unit 206 shows a camera application screen of the smartphone 200 to be described below in connection with FIG. 7. To allow the smartphone 200 to immediately find and be paired with a digital camera 100, the camera application screen is updated each time a digital camera 100 has been detected or disappeared. When the application screen is in the foreground state, in which the application screen is displayed by the camera application, the smartphone 200 increases the predetermined scan frequency (the first frequency or cycle) by narrowing the intervals between scans. Note that FIGS. 3A-3C schematically show the frequencies 303 with which the close proximity wireless communication unit 214 of the smartphone 200 scans for the beacon signal.

FIGS. 3B-3C show the state in which the camera application has transited to the background state due to an operation of the user 301. When the camera application of the smartphone 200 is in the background state, in which the camera application does not display the application screen, the user 301 no longer needs to check the application screen of the smartphone 200. In this case, as shown in FIG. 3C, the smartphone 200 can reduce the power consumption due to scanning and thus the battery consumption of the smartphone 200 by increasing the intervals between scans to lower the predetermined scan frequency (to the second frequency or cycle).

Data Structure Diagram of Advertisement Signal

The data configuration of the BLE advertisement signal of the present embodiment will be described hereinafter with reference to FIG. 4.

The advertisement signal transmitted by the digital camera 100 includes a manufacture data region 401 into which specific information, such as a device name, a unique device ID, and a service ID, can be freely added. A camera ID 402, which is an individual identifier of the digital camera 100, and pairing information 403 that indicates the state of pairing between the digital camera 100 and the smartphone 200 are written in the manufacture data region 401 as the specific information.

The smartphone 200 is capable of determining whether or not the smartphone 200 is compatible with the digital camera based on the camera ID 402 and also capable of detecting a pairing request from the digital camera 100 by determining from the pairing information 402 whether or not pairing has been made.

Sequence to Control Scan Frequency

The following describes the sequence to control the frequency with which the smartphone 200 scans for the advertisement signal of a digital camera 100 with reference to FIG. 5.

The following describes a case in which the smartphone 200 detects a plurality of digital cameras 100 (cameras 100A and 100B).

In T501, the user activates the camera application 220 of the smartphone 200. Upon activation, the camera application 220 transits to the foreground state to display the application screen, where a user operation can be received.

In T502a, the camera application 220 performs scan control to set the scan frequency to a high level in order to immediately detect digital cameras 100 and present the list of digital cameras 100 to the user. Specifically, the API to cause an OS 230 to perform various operations is called.

In T503, the camera application 220 transmits a scan start command to the OS 230 to perform scanning at a high scan frequency.

Upon receiving the scan start command, in T521a, the OS 230 transmits the scan start command to the communication unit 211, which in turn starts scanning at the scan cycle held by the OS 230. As a result, the smartphone 200 is now capable of detecting the advertisement signal transmitted by a digital camera 100.

After a predetermined scan cycle has elapsed, in T502b, the application 220 resumes control to set the scan frequency to a high level. This predetermined scan cycle is a cycle held by the application 220, and is shorter than the aforementioned scan frequency held by the OS 230. As a result, in T504a, the application 220 periodically transmits a scan restart command to the OS 230 to suspend and immediately start scanning. This command may be a single command to both suspend and start scanning, or a scan stop command may be transmitted first, to be followed by a scan start command identical with the command in T503 that is subsequently transmitted.

In this way, by repeating a scan restart at a high frequency, high frequency scanning can be implemented in effect. This control is performed for the reasons below. That is, according to the present embodiment, a case is assumed that it is the OS 230 that can control the scan frequency, and the application 220 cannot instruct the OS 230 to change the control scan frequency. Therefore, by repeating a scan restart at a higher frequency than the scan frequency of the OS 230, high frequency scanning can be implemented through the control by the application 220. In particular, since many known operating systems for smartphones limit control by applications, the present embodiment assumes control for such operating systems. Of course, it is possible to use an embodiment in which the application 220 directly instructs the OS 230 to change the control scan frequency.

In T541a, when the user turns on the power supply to the camera 100A, the camera 100A transmits an advertisement signal to the surroundings in T542b.

Upon periodically receiving a scan restart command from the application 220 (T504a-T504b), the OS 230 performs scanning (T521b).

In T505, the camera 100A is detected by the scanning performed by the OS 230, and the application 220 receives a device detection notification from the OS 230 in T522a. Furthermore, the camera application 220 saves information about the detected camera 100A in a detection list.

In T506, which is the next scan cycle, the camera application 220 clears all the information about the cameras, including the detected camera 100A, to detect the latest detection situation and the disappearance situation. In T504c, the camera application 220 transmits to the OS 230 a scan restart command whose scan frequency is set higher than that of the OS 230. Upon receiving a scan restart command from the camera application 220 (T504c), the OS 230 performs scanning (T521c).

As described above, the periodic scan control by the camera application 220 is performed at a shorter cycle than the scan cycle performed by the OS 230. For example, if the scan cycle performed by the camera application 220 is to be referred to as a first cycle (for example, one minute), the scan cycle performed by the OS 230 may be referred to as a second cycle that is longer than the first cycle. In this way, as the camera application 220 of the present embodiment is incapable of directly instructing the OS 230 to scan at the first cycle, which is a shorter interval than the second cycle, the scan control through a scan restart command issued by the application 220 is required.

In T507, the camera application 220 automatically transits to the background state if an application other than the camera application 220 is activated by a user operation or after a predetermined time has elapsed to reduce the battery power consumption. In this case, the camera application 220 causes the OS 230 to execute the background processing of the camera application 220 (T508) and stops transmitting scan restart commands to the OS 230. This causes the OS 230 to perform scanning at its scan cycle, which is longer than the scan cycle of the camera application 220 (T521d).

In T541b, when the user turns on the power supply to the camera 100B, the camera 100B transmits an advertisement signal to the surroundings in T542b. In this case, as the camera application 220 does not immediately detect the camera 100B as scanning is being performed at a scan cycle of the OS 230 that is longer than the scan cycle of the camera application 220 (T521d).

Subsequently, when detecting the camera 100B upon completion of the scan cycle of the OS 230 (T521d), the OS 230 transmits a device detection notification to the camera application 220 (T522b).

In T509, the camera application 220 saves, in the detection list, information about the camera 100B detected in the scan cycle of the OS 230. The OS 230 continues to perform scanning at its own scan cycle (T521e).

In T510, when the user causes the camera application 220 to transit back to the foreground state, the camera application 220 changes the scan frequency to the higher level and outputs a scan restart command to the OS 230 (T504d).

As described above, in the smartphone 200, the camera application 220 controls the frequency with which the OS 230 performs scanning according to whether the camera application 220 has transited to the background state or the foreground state. Additionally, when the camera application 220 is in the foreground state, it is possible to immediately find the digital camera 100 to be connected to. Moreover, in the background state, in which the user is not using the camera application 220, the smartphone 200 can reduce its power consumption.

Note that, in the present embodiment, while transition of the camera application 220 to the background state or the foreground state is discussed as an example of the change in the state of the camera application 220, the present invention is not limited to this. For example, the scan frequency may be alternatively controlled depending on whether or not the camera application 220 is set to display the detection situation of the advertisement signal on the display unit 206 of the smartphone 200 (whether or not display settings exists).

Furthermore, when the camera application 220 presents display to the user to confirm whether or not to acquire information about the location of the digital camera 100 via BLE, the scan frequency may be changed if the user is unable to view the display because a different function is being used or because a dialog is being displayed.

Moreover, if it is assumed to apply the foregoing to anything other than applications for smartphones, for example, to the OS of the Windows system, the scan frequency may be changed when the scan result screen is minimized or cannot be seen by the user as it is hidden behind another window.

Control of Scan Frequency

Figure 6A:
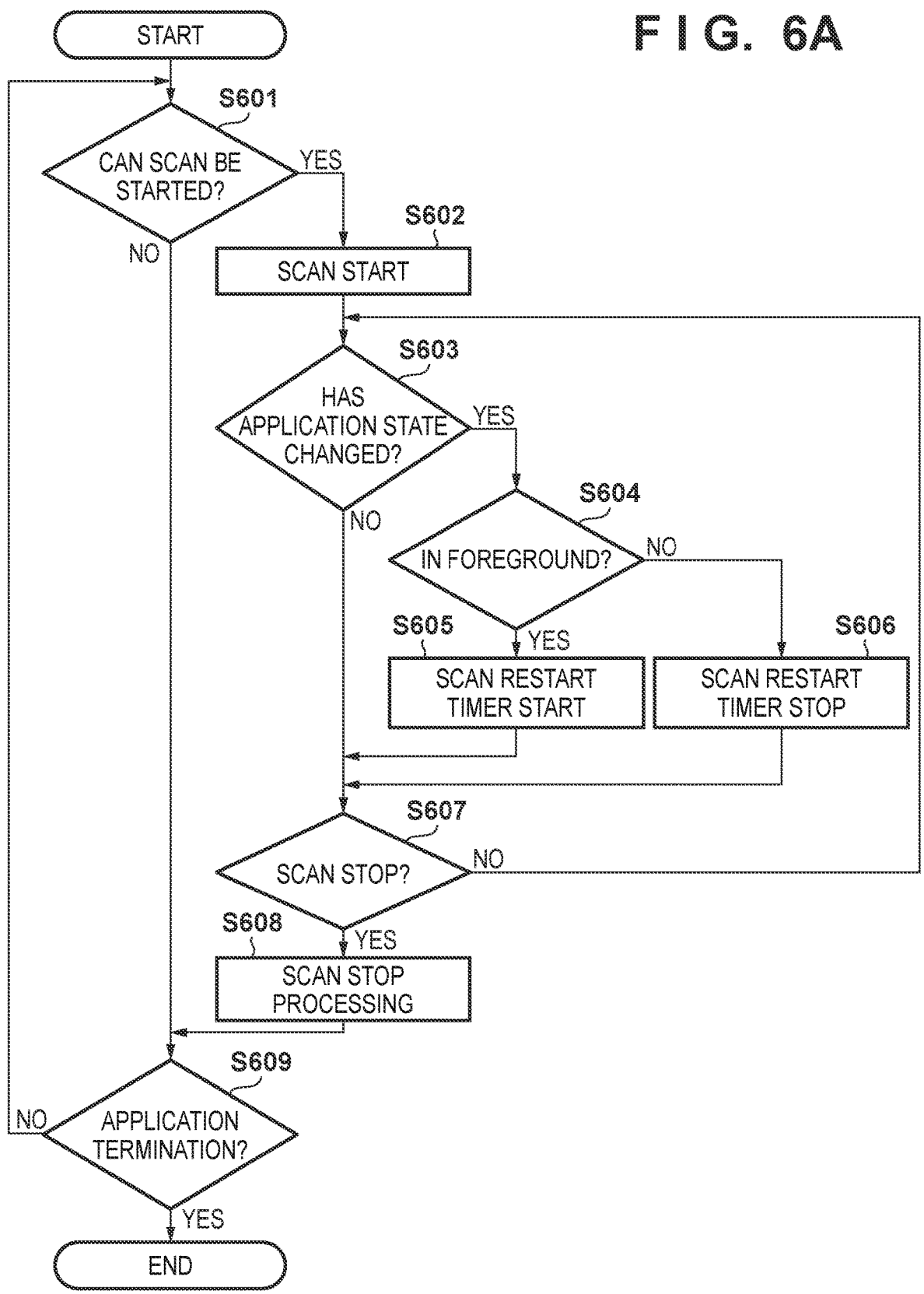
FIG. 6A is a flowchart showing the scan control performed by the camera application of the smartphone of the first embodiment.
Figure 6B:
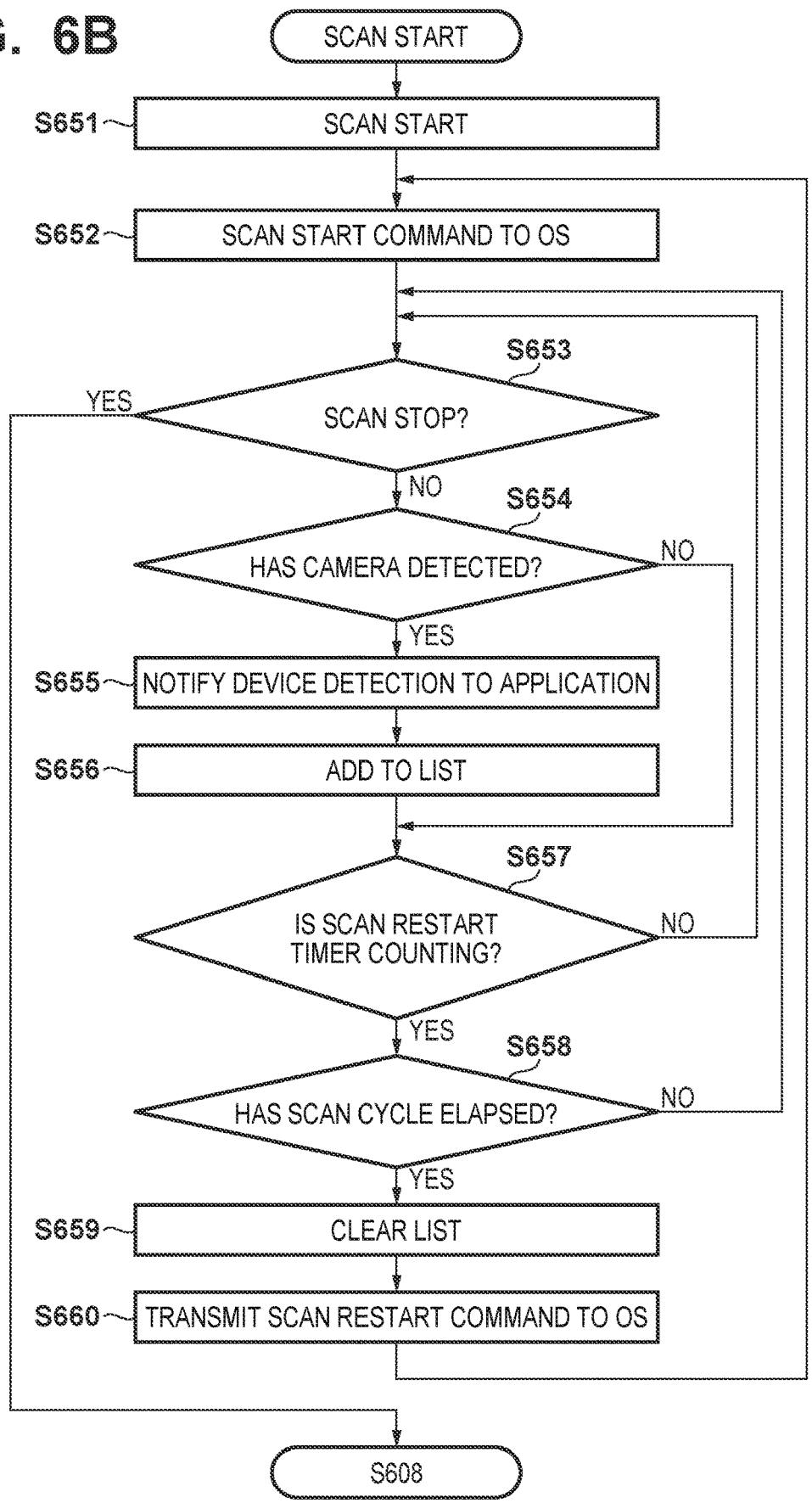
FIG. 6B is a flowchart showing the processing to start the scan control in S602 of FIG. 6A.

The following describes the processing to control the scan frequency with which the smartphone 200 detects the advertisement signal of the digital camera 100 with reference to FIGS. 6A and 6B.

FIG. 6A shows one example of the scan control performed by the camera application 220 of the smartphone 200. This scan control is started when the user activates the camera application 220 of the smartphone 200.

In S601, the camera application 220 determines whether or not scanning can be started by the OS 230, and if it is possible to start scanning, the processing proceeds to S602 and, if not, proceeds to S608. The camera application 220 determines whether or not the OS 230 can start scanning by determining in the settings of the OS 230, for example, whether or not BLE is activated to be able to detect an advertisement signal. Alternatively, it is also possible to determine whether or not the OS 230 can start scanning by determining whether or not the use authority of BLE of the camera application 220 is valid.

In S602, scan control to detect a digital camera 100 is started and the processing proceeds to S603. Details of S602 will be described below in connection with FIG. 6B. In S603, the camera application 220 determines whether or not the user has changed the state of the camera application (transition to the foreground/background). If the state has been changed, the processing proceeds to S604, and, if not, the processing proceeds to S607.

In S604, the camera application 220 determines whether or not the camera application 220 has transited to the foreground state. If the camera application 220 has transited to the foreground state, the processing proceeds to S605, and, if not, the processing proceeds to S606.

In S605, the camera application 220 sets the scan frequency to that in the scan restart command to be transmitted to the OS 230 and starts counting time on the timer. In S606, the timer count to transmit the scan restart command is stopped (transmission of the scan restart command is stopped) and the processing proceeds to S607.

In S607, the camera application 220 determines whether or not the scan control has transited to a condition in which the control is to be stopped or terminated. If the scan control has transited to a condition in which the control is to be stopped or terminated, the processing proceeds to S608, and, if the scan control has transited to a condition in which the control is to be continued, the processing returns to S603. Here, the camera application 220 determines that the scanning is to be discontinued, for example, if the user has disabled the BLE function of the OS 230 of the smartphone 200 or the camera application 220 is connected to a different digital camera via a wireless LAN.

In S608, the camera application 220 stops scanning and the processing proceeds to S609.

In S609, the camera application 220 determines whether or not the user has issued an instruction to terminate the application 220. If a termination instruction has been issued, the processing is terminated and, if not, the processing returns to S601.

Next, the processing to start the scan control in S602 of FIG. 6A will be described with reference to FIG. 6B.

In S651, the camera application 220 starts scanning for an advertisement signal transmitted by the digital camera 100 and, in S652, transmits a scan start signal to the OS 230. Then, the processing proceeds to S653.

In S653, as in S607, the camera application 220 determines whether or not the scan control has transited to a condition in which the control is to be stopped or terminated. If the scan control has transited to a condition in which the control is to be stopped or terminated, the processing proceeds to S608 of FIG. 6A, and, if the scan control has transited to a condition in which the control is to be continued, the processing proceeds to S654.

In S654, the camera application 220 determines whether or not the OS 230 has detected a digital camera 100 to connect to. If such a camera is detected, the processing proceeds to S655 and, if not, proceeds to S657.

In S655, the OS 230 outputs a device detection notification (a notification indicating that a digital camera 100 has been detected) to the camera application 220, and the processing proceeds to S656.

In S656, upon receiving the device detection notification from the OS 230, the camera application 220 adds the detected digital camera 100 to the list held by the application 220. Furthermore, the camera application 220 displays, as an application screen, the list of the camera name of the detected camera 100 and the like on the display unit 206, and presents the list to the user.

In S657, the camera application 220 determines whether or not the timer is currently counting time in S605 or S606 in FIG. 6A. If the timer is counting time, the processing proceeds to S658 and, if not, returns to S653.

In S658, the camera application 220 determines whether or not the timer, which is currently counting time in S657, has reached the set time (whether or not the scan cycle has completed). If it has, the processing proceeds to S659 and, if not, returns to S653.

In S659, the camera application 220 clears the information on the current list and the processing proceeds to S660.

In S660, the camera application 220 transmits a scan restart command to the OS 230 and the processing returns to S653. Note that, while the camera application 220 transmits a scan restart command to the OS 230 in S659 and S660, the application 220 also updates the list if a digital camera 100 that transmits an advertisement signal has disappeared so as to update the list displayed on the application screen of the display unit 206. This allows for presenting the latest detection situation and the disappearance situation to the user.

Application Screen

Figure 7:
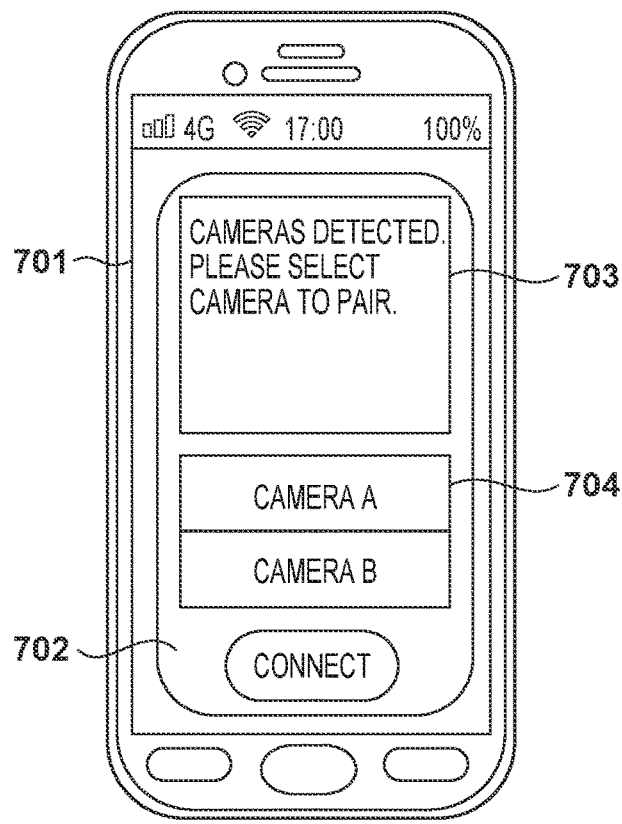
FIG. 7 is a view exemplifying an application screen of a smartphone of the first embodiment.

Next, the application screen displayed on the display unit 206 by the camera application 220 of the smartphone 200 will be described with reference to FIG. 7.

Once the OS 230 detects an advertisement signal and the camera application 220 receives a device detection notification from the OS 230, the camera application 220 controls the display unit 206 to display a pairing dialogue 702 on the top screen 701 of the camera application 220.

The pairing dialogue 702 includes a message region 703 and a list 704 of detected cameras. Once the pairing dialogue 702 is displayed on the application screen, the user can select a digital camera 100 to pair up with. Additionally, the camera list 704 is immediately updated as a scan restart is made in keeping with the start and stop of the transmission of an advertisement signal from the digital camera 100.

According to the present embodiment, the smartphone 200 is capable of connecting to the digital camera 100 via BLE while reducing the power consumption of the smartphone 200 by controlling the scan frequency according to the state of the camera application 220 of the smartphone 200.

Note that, in the present embodiment, the scan frequency is controlled by adjusting the scan interval. Alternatively, if the camera application 220 is capable of changing the scan frequency of the OS 230, that capability may be used to control the scan frequency.

The present embodiment is directed to the method of connecting the smartphone 200 and the digital camera 100. However, if the camera application 220 in a device on which a battery is mounted, such as a laptop PC, is used to control scanning, the scan frequency may additionally be controlled according to the state of display, such as minimization or maximization of a window, that shows the scan result, in addition to the foreground state or the background state of the camera application 220.

Second Embodiment

The following describes a second embodiment.

Described in connection with the first embodiment is a processing to control the scan frequency according to whether the camera application 220 of the smartphone 200 is in the background state or in the foreground state.

The digital camera 100 is capable of changing the content of the advertisement signal according to the state of the camera or the like. Meanwhile, the following describes the processing according to the second embodiment in which the camera application 220 performs more detailed control of the scan frequency according to the type of the advertisement signal and the state of the camera application 220.

Data Structure of Advertisement Signal

Figure 8A:
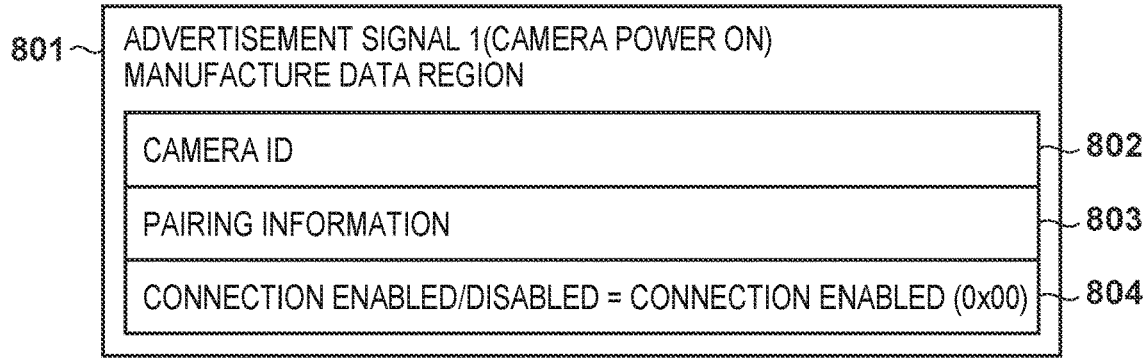
FIGS. 8A and 8B are views of the data structure of an advertisement packet of the second embodiment.
Figure 8B:
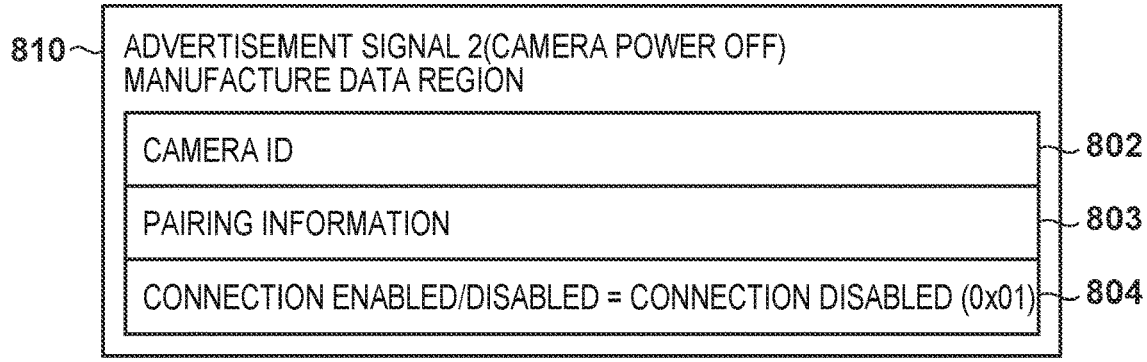

First, the data configuration of the BLE advertisement signal of the present embodiment will be described hereinafter with reference to FIGS. 8A-8B.

The manufacture data region 801 of the advertisement signal according to the second embodiment contains, in addition to a camera ID 802 and pairing information 803, connection enabled/disabled information 804 that indicates whether it is possible to automatically connect to the digital camera 100 without involving user operation.

The digital camera 100 transmits an advertisement signal after switching the type of the advertisement signal according to whether the power supply is on or off. In particular, the digital camera 100, when in the power on state, transmits an advertisement signal 1 in which information that indicates connection is possible is written in the connection enabled/disabled information 804, as shown in FIG. 8A. In addition, the digital camera 100, when in the power off state, transmits an advertisement signal 2 in which information that indicates connection is not possible is written in the connection enabled/disabled information 804, as shown in FIG. 8B.

The camera application 220 of the smartphone 200 is capable of determining whether or not the smartphone 200 can automatically connect to the digital camera 100 based on the connection enabled/disabled information 804 of the advertisement signal received from the digital camera 100. The camera application 220 of the smartphone 200 then controls the scan frequency according to the state of the application 220 and the type of the advertisement signal.

Control of Scan Frequency

Next, the control of the scan frequency by the camera application 220 according to the second embodiment will be described with reference to FIG. 9.

FIG. 9 illustrates the correspondence relationship among the scan frequencies controlled by the camera application 220 according to the second embodiment, the states of the camera application 220, and the types of the advertisement signal of the digital camera 100.

When the camera application 220 is in the foreground state 903, the camera application 220 sets the scan frequency to a high level upon detecting an advertisement signal 1 (901) that indicates that automatic connection to the digital camera 100 is allowed. In this way, when a digital camera 100 is requesting a connection while the user is using the camera application 220 and the digital camera 100, the scan frequency is set high as it is necessary to immediately connect to the digital camera 100.

When the camera application 220 is in the foreground state 903, the camera application 220 sets the scan frequency to a low level upon detecting an advertisement signal 2 (902) that indicates that automatic connection to the digital camera 100 is not possible. In this way, when the user selects whether or not to connect to a digital camera 100 via the camera application 220, the scan frequency is set low as it is not necessary to immediately detect the digital camera 100.

When the camera application 220 is in the background state 904, the camera application 220 sets the scan frequency to an intermediate level between the high and low levels (a "middle" scan frequency) upon detecting an advertisement signal 1 (901) that indicates that automatic connection to the digital camera 100 is allowed. In this way, when a digital camera 100 is requesting a connection while the user is not using the camera application 220, the scan frequency is set to the middle level as it is possible to receive a request for data from the digital camera 100 due to the user operating the digital camera 100. One possible case in which the digital camera 100 requests data from the camera application 220 due to the user operating the digital camera 100 is, for example, a case where location information of the smartphone 200 is requested as the user issues a shooting instruction.

When the camera application 220 is in the background state 904, the camera application 220 sets the scan frequency to a low level upon detecting an advertisement signal 2 (902) that indicates that automatic connection to the digital camera 100 is not possible. In this way, when the user selects whether or not to connect to a digital camera 100 via the camera application 220 while the user is not using the camera application 220, the scan frequency is set low as it is not necessary to immediately detect the digital camera 100.

As shown above, according to the present embodiment, more detailed control of the scan frequency can be performed according to the state of the application 220 and the type of the advertisement signal of the digital camera 100. In this way, it is possible to reduce the battery consumption of the smartphone 200 and to properly control the scan cycle in response to the connection request from the digital camera 100.

In the present embodiment, examples in which the scan frequency can be controlled according to the state of the camera application 220 have been described. However, the state of the transmission of the advertisement signal is also subject to change according to the operation of the digital camera 100. Therefore, the scan frequency may be changed after a lapse of predetermined time if a considerable change has occurred in the states of the camera application 220 and the digital camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-242231, filed Dec. 18, 2017 which is hereby incorporated by reference herein in its entirety.

What is claimed is:

1. A communication apparatus comprising:
a wireless communication device configured to wirelessly communicate with an electronic apparatus present within a predetermined range;
a signal detector configured to detect a wireless signal transmitted from the electronic apparatus at a predetermined frequency; and
a processor configured to implement an application installed on the communication apparatus, to control the electronic apparatus remotely via the wireless communication device;
wherein the signal detector changes the predetermined frequency to a first frequency when the application is in a foreground state and changes the predetermined frequency to a second frequency that is lower than the first frequency when the application is in a background state.

2. The apparatus according to claim 1, wherein the signal detector changes the predetermined frequency to the second frequency after a lapse of predetermined time after the application transited to the background state.

3. The apparatus according to claim 1, wherein the signal detector changes the predetermined frequency according to the state of the application and the type of the wireless signal of the electronic apparatus.

4. The apparatus according to claim 1, wherein the application transmits a command to the signal detector to change the predetermined frequency to the first frequency, and wherein the signal detector detects the wireless signal at the second frequency in a case where the command has not been received.

5. The apparatus according to claim 1, wherein the signal detector notifies the application that the signal detector has detected electronic apparatuses that transmit the wireless signal, and wherein the application saves the detected electronic apparatuses in a list and presents the list to allow a user to select from the detected electronic apparatuses an electronic apparatus that the user desires to connect to.

6. The apparatus according to claim 5, wherein the application clears the list when the electronic apparatus is detected and transmits a restart command to cause the signal detector to stop and resume detecting the wireless signal.

7. The apparatus according to claim 1, wherein the wireless signal contains unique information about the electronic apparatus and information to connect the electronic apparatus to the communication apparatus.

8. The apparatus according to claim 7, wherein the wireless signal further contains information that indicates whether it is possible to connect to the communication apparatus.

9. The apparatus according to claim 8,
wherein the signal detector changes the predetermined frequency to the first frequency regardless of the state of the application if the wireless signal contains information indicating that it is not possible to connect to the communication apparatus, wherein the signal detector changes the predetermined frequency to the second frequency if the wireless signal contains information indicating that it is possible to connect to the communication apparatus and the application is in the foreground state, and wherein the signal detector changes the predetermined frequency to an intermediate frequency between the first frequency and the second frequency if the wireless signal contains information indicating that it is possible to connect to the communication apparatus and the application is in the background state.

10. The apparatus according to claim 1, wherein the wireless communication is short-range wireless communication, and wherein the signal detector detects a wireless signal transmitted from the electronic apparatus to communicate the presence of the electronic apparatus.

11. A system in which a communication apparatus wirelessly communicates with an electronic apparatus present within a predetermined range;
wherein the electronic apparatus comprises:
a wireless communication device configured to wirelessly communicate with the communication apparatus present within the predetermined range; and
a signal detector configured to control the communication unit to transmit a wireless signal that notifies the communication apparatus of the presence of the electronic apparatus;
wherein the communication apparatus comprises:
a wireless communication device configured to wirelessly communicate with the electronic apparatus present within the predetermined range;
a signal detector configured to detect a wireless signal transmitted from the electronic apparatus at a predetermined frequency; and
a processor configured to implement an application installed on the communication apparatus, to control the electronic apparatus remotely via the wireless communication device;

wherein the signal detector changes the predetermined frequency to a first frequency when the application is in a foreground state and changes the predetermined frequency to a second frequency that is lower than the first frequency when the application is in a background state.

12. A method of controlling a communication apparatus having a wireless communication device configured to wirelessly communicate with an electronic apparatus present within a predetermined range, the method comprising:
detecting a wireless signal transmitted from the electronic apparatus at a predetermined frequency; and
implementing an application installed on the communication apparatus to control the electronic apparatus remotely via the wireless communication device;
wherein the implementing changes the predetermined frequency to a first frequency when the application is in a foreground state and changes the predetermined frequency to a second frequency that is lower than the first frequency when the application is in a background state.

13. A non-transitory computer-readable storage medium storing a program for causing a computer to function as a communication apparatus comprising:
a wireless communication device configured to wirelessly communicate with an electronic apparatus present within a predetermined range;
a signal detector configured to detect a wireless signal transmitted from the electronic apparatus at a predetermined frequency; and
a processor configured to implement an application installed on the communication apparatus, to control the electronic apparatus remotely via the wireless communication device;
wherein the signal detector changes the predetermined frequency to a first frequency when the application is in a foreground state and changes the predetermined frequency to a second frequency that is lower than the first frequency when the application is in a background state.

* * * * *